(12) United States Patent
He

(10) Patent No.: US 12,648,029 B2
(45) Date of Patent: Jun. 2, 2026

(54) SCTP PROXY GATEWAY FOR AMF DISCOVERY AND LOAD-BALANCED ROUTING VIA DNS

(71) Applicant: TENCENT TECHNOLOGY (SHENZHEN) COMPANY LIMITED, Shenzhen (CN)

(72) Inventor: Rugen He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 350 days.

(21) Appl. No.: 18/448,967

(22) Filed: Aug. 14, 2023

(65) Prior Publication Data

US 2023/0389091 A1     Nov. 30, 2023

Related U.S. Application Data

(63) Continuation of application No. PCT/CN2022/091981, filed on May 10, 2022.

(30) Foreign Application Priority Data

May 21, 2021     (CN) .......................... 202110557193.0

(51) Int. Cl.
*H04W 76/10*          (2018.01)
*H04L 61/4511*       (2022.01)
*H04L 67/133*        (2022.01)

(52) U.S. Cl.
CPC ......... *H04W 76/10* (2018.02); *H04L 61/4511* (2022.05); *H04L 67/133* (2022.05)

(58) Field of Classification Search
CPC ... H04W 76/10; H04L 67/133; H04L 61/4511

(Continued)

(56) References Cited

U.S. PATENT DOCUMENTS

2019/0058741 A1     2/2019   Mufti et al.
2019/0268806 A1     8/2019   Zhu et al.
(Continued)

FOREIGN PATENT DOCUMENTS

CN          108738077 A      11/2018
CN          111385369 A      7/2020
(Continued)

OTHER PUBLICATIONS

Srivastava, Proxy Edge Function For Cloud Based 5G Core, Technical Disclosure Commons, retrieved from https://www.tdcommons.org/dpubs_series/3579, Sep. 2020 (Year: 2020).*

(Continued)

*Primary Examiner* — Nicholas R Taylor
*Assistant Examiner* — Chong G Kim
(74) *Attorney, Agent, or Firm* — Anova Law Group, PLLC

(57)          ABSTRACT

A communication method includes: establishing, in response to an SCTP connection request transmitted by a base station device, an SCTP connection with the base station device; receiving a service setup request transmitted by the base station device based on the SCTP connection after the SCTP connection is established; encapsulating request data included in the service setup request as a request message; querying, according to pre-configured AMF domain name information, for an AMF network address corresponding to the AMF domain name information; transmitting the request message to a target AMF corresponding to the AMF network address; encapsulating, based on an SCTP protocol, a response message returned by the target AMF for the request message to obtain a response result; and transmitting the response result to the base station device.

17 Claims, 8 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2021/0084554 A1 * | 3/2021 | Chen ................. | H04W 36/1443 |
| 2021/0320896 A1 | 10/2021 | Feng | |
| 2023/0389091 A1 | 11/2023 | He | |

FOREIGN PATENT DOCUMENTS

| | | | |
|---|---|---|---|
| CN | 111757389 A | 10/2020 | |
| CN | 113347738 A | 9/2021 | |
| WO | 2018236624 A1 | 12/2018 | |
| WO | 2020030287 A1 | 2/2020 | |
| WO | 2020199896 A1 | 10/2020 | |

OTHER PUBLICATIONS

The World Intellectual Property Organization (WIPO) International Search Report for PCT/CN2022/091981 Aug. 2, 2022 7 Pages (including translation).
The State Intellectual Property Office of the People's Republic of China (SIPO) Office Action 1 for 202110557193.0 Feb. 1, 2024 8 Pages (including translation).

\* cited by examiner

AMF service for
region 1

AMF

AMF

AMF

AMF

Load balancer gRPC and HTTP/2

SCTP proxy
gateway 302

Return AMF IP

Query for IP
according to AMF
domain name

DNS load
balancing
gateway 303

AMF service for
region 2

AMF

AMF

Load balancer gRPC and HTTP/2

SCTP proxy
gateway 302'

SCTP

SCTP

SCTP

SCTP

Base station
device 301

Base station
device

Base station
device

Base station
device 304

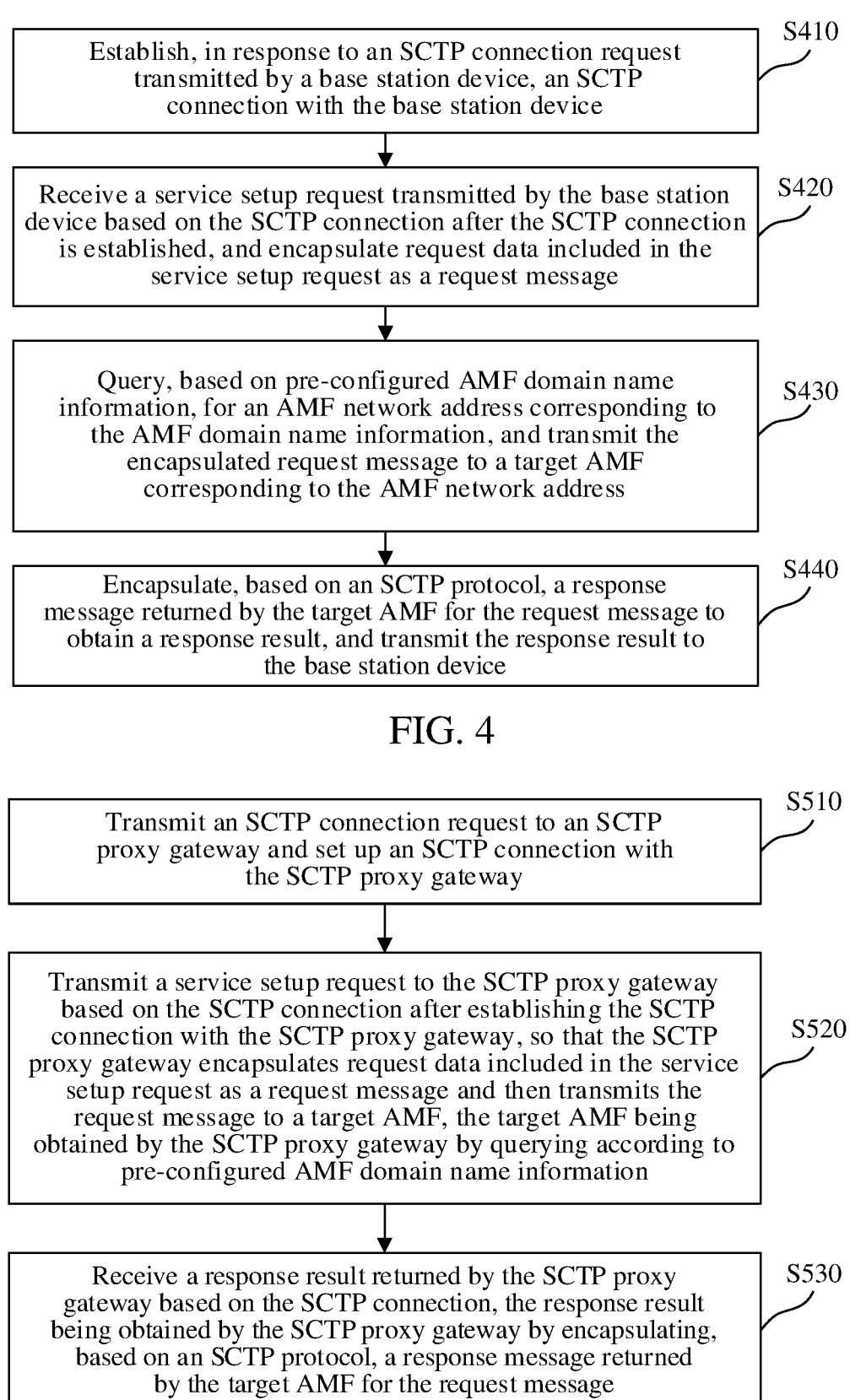

Establish, in response to an SCTP connection request transmitted by a base station device, an SCTP connection with the base station device
S410

Receive a service setup request transmitted by the base station device based on the SCTP connection after the SCTP connection is established, and encapsulate request data included in the service setup request as a request message
S420

Query, based on pre-configured AMF domain name information, for an AMF network address corresponding to the AMF domain name information, and transmit the encapsulated request message to a target AMF corresponding to the AMF network address
S430

Encapsulate, based on an SCTP protocol, a response message returned by the target AMF for the request message to obtain a response result, and transmit the response result to the base station device
S440

FIG. 4

Transmit an SCTP connection request to an SCTP proxy gateway and set up an SCTP connection with the SCTP proxy gateway
S510

Transmit a service setup request to the SCTP proxy gateway based on the SCTP connection after establishing the SCTP connection with the SCTP proxy gateway, so that the SCTP proxy gateway encapsulates request data included in the service setup request as a request message and then transmits the request message to a target AMF, the target AMF being obtained by the SCTP proxy gateway by querying according to pre-configured AMF domain name information
S520

Receive a response result returned by the SCTP proxy gateway based on the SCTP connection, the response result being obtained by the SCTP proxy gateway by encapsulating, based on an SCTP protocol, a response message returned by the target AMF for the request message
S530

FIG. 5

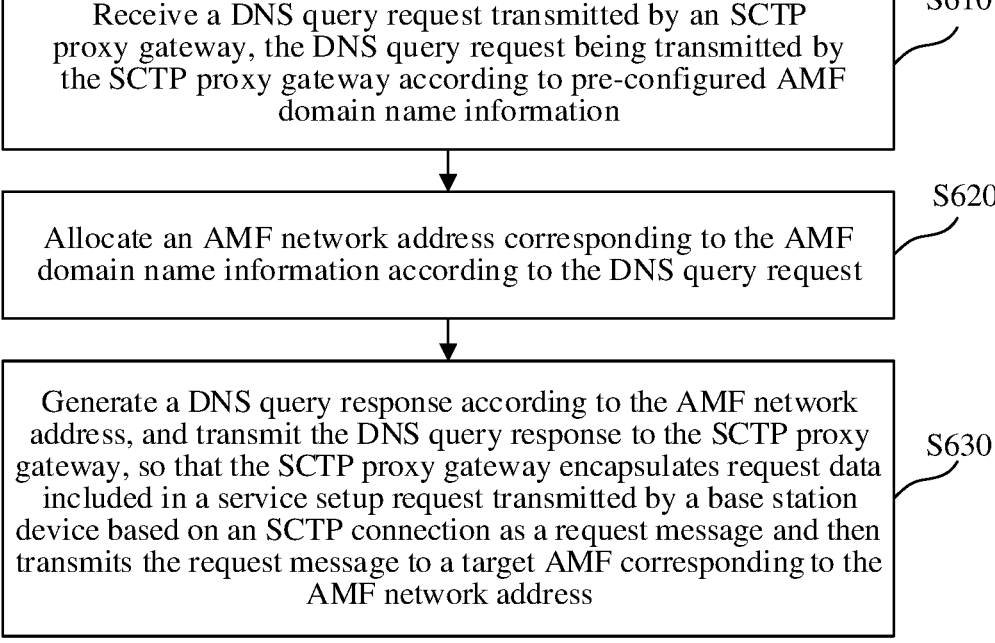

Receive a DNS query request transmitted by an SCTP proxy gateway, the DNS query request being transmitted by the SCTP proxy gateway according to pre-configured AMF domain name information

S610

Allocate an AMF network address corresponding to the AMF domain name information according to the DNS query request

S620

Generate a DNS query response according to the AMF network address, and transmit the DNS query response to the SCTP proxy gateway, so that the SCTP proxy gateway encapsulates request data included in a service setup request transmitted by a base station device based on an SCTP connection as a request message and then transmits the request message to a target AMF corresponding to the AMF network address

SCTP PROXY GATEWAY FOR AMF DISCOVERY AND LOAD-BALANCED ROUTING VIA DNS

CROSS-REFERENCES TO RELATED APPLICATIONS

This application is a continuation application of PCT Patent Application No. PCT/CN2022/091981, entitled "COMMUNICATION METHOD, APPARATUS, COM-PUTER-READABLE MEDIUM ELECTRONIC DEVICE, AND PROGRAM PRODUCT" and filed on May 10, 2022, which claims priority to Chinese Patent Application No. 202110557193.0, entitled "COMMUNICATION METHOD AND APPARATUS, COMPUTER-READABLE MEDIUM, AND ELECTRONIC DEVICE" and filed with the China National Intellectual Property Administration on May 21, 2021, the entire contents of both of which are incorporated herein by reference.

FIELD OF THE TECHNOLOGY

The present disclosure relates to the field of computer and communication technologies, and specifically, to a communication method and apparatus, a computer-readable medium, an electronic device, and a program product.

BACKGROUND

In the related art, if a core network of a 5G private network needs to be deployed in a local computer room of an enterprise private network, interaction information between core network elements is not exposed to a public network because it is interconnected through a local area network and does not involve operation such as NAT (Network Address Translation), which causes no security concerns.

When the core network elements of the 5G private network are migrated to a cloud for deployment, the NAT problem of an SCTP (Stream Control Transmission Protocol) connection between a base station and an AMF (Access and Mobility Management Function) deployed in the cloud, and the message security problem in the transmission process are urgent technical problems to be resolved.

SUMMARY

Embodiments of the present disclosure provide a communication method and apparatus, a computer-readable medium, an electronic device, and a program product, to optimize the networking mode between a base station device and an AMF at least to some extent, to implement flexibility of AMF deployment on the premise of ensuring secure communication between the AMF and the base station device, thereby improving the service processing capability of the AMF.

Other features and advantages of the present disclosure become obvious through the following detailed descriptions, or may be partially learned through the practice of the present disclosure.

According to an aspect of the embodiments of the present disclosure, a communication method is provided, the communication method being performed by an SCTP proxy gateway and including: establishing, in response to an SCTP connection request transmitted by a base station device, an SCTP connection with the base station device; receiving a service setup request transmitted by the base station device based on the SCTP connection after the SCTP connection is established; encapsulating request data included in the service setup request as a request message; querying, according to pre-configured AMF domain name information, for an AMF network address corresponding to the AMF domain name information; transmitting the request message to a target AMF corresponding to the AMF network address; encapsulating, based on an SCTP protocol, a response message returned by the target AMF for the request message to obtain a response result; and transmitting the response result to the base station device.

According to an aspect of the embodiments of the present disclosure, a communication method is provided, the communication method being performed by a base station device and including: transmitting an SCTP connection request to an SCTP proxy gateway and establishing an SCTP connection with the SCTP proxy gateway; transmitting a service setup request to the SCTP proxy gateway based on the SCTP connection after establishing the SCTP connection with the SCTP proxy gateway, so that the SCTP proxy gateway encapsulates request data included in the service setup request as a request message and then transmits the request message to a target AMF, the target AMF being obtained by the SCTP proxy gateway by querying according to pre-configured AMF domain name information; and receiving a response result returned by the SCTP proxy gateway based on the SCTP connection, the response result being obtained by the SCTP proxy gateway by encapsulating, based on an SCTP protocol, a response message returned by the target AMF for the request message.

According to an aspect of the embodiments of the present disclosure, a communication method is provided, the communication method being performed by a Domain Name System (DNS) load balancing gateway and including: receiving a DNS query request transmitted by an SCTP proxy gateway, the DNS query request being transmitted by the SCTP proxy gateway according to pre-configured AMF domain name information; allocating an AMF network address corresponding to the AMF domain name information according to the DNS query request; generating a DNS query response according to the AMF network address, and transmitting the DNS query response to the SCTP proxy gateway, so that the SCTP proxy gateway encapsulates request data included in a service setup request transmitted by a base station device based on an SCTP connection as a request message and then transmits the request message to a target AMF corresponding to the AMF network address.

According to an aspect of the embodiments of the present disclosure, a communication apparatus is provided, the communication apparatus being deployed on a stream control transmission protocol SCTP proxy gateway and including: a first setup unit, configured to establish, in response to an SCTP connection request transmitted by a base station device, an SCTP connection with the base station device in response to an SCTP connection request transmitted by the base station device; a first receiving unit, configured to receive a service setup request transmitted by the base station device based on the SCTP connection after the SCTP connection with the base station device is established, and encapsulate request data included in the service setup request as a request message; a processing unit, configured to query, according to pre-configured AMF domain name information, for an AMF network address corresponding to the AMF domain name information, and transmit the request message to a target AMF corresponding to the AMF network address; and a first transmission unit, configured to encapsulate, based on an SCTP protocol, a response message returned by the target AMF for the request message to obtain a response result, and transmit the response result to the base station device.

According to an aspect of the embodiments of the present disclosure, a communication apparatus is provided, the communication apparatus being deployed on a base station device and including: a second setup unit, configured to transmit an SCTP connection request to an SCTP proxy gateway and establish an SCTP connection with the SCTP proxy gateway; a second transmission unit, configured to transmit a service setup request to the SCTP proxy gateway based on the SCTP connection after the SCTP connection with the SCTP proxy gateway is established, so that the SCTP proxy gateway encapsulates request data included in the service setup request as a request message and then transmits the request message to a target AMF, the target AMF being obtained by the SCTP proxy gateway by querying according to pre-configured AMF domain name information; and a second receiving unit, configured to receive a response result returned by the SCTP proxy gateway based on the SCTP connection, the response result being obtained by the SCTP proxy gateway by encapsulating, based on an SCTP protocol, a response message returned by the target AMF for the request message.

According to an aspect of the embodiments of the present disclosure, a communication apparatus is provided, the communication apparatus being deployed on a DNS load balancing gateway and including: a third receiving unit, configured to receive a DNS query request transmitted by an SCTP proxy gateway, the DNS query request being transmitted by the SCTP proxy gateway according to pre-configured AMF domain name information; an allocation unit, configured to allocate an AMF network address corresponding to the AMF domain name information according to the DNS query request; and a third transmission unit, configured to generate a DNS query response according to the AMF network address, and transmit the DNS query response to the SCTP proxy gateway, so that the SCTP proxy gateway encapsulates request data included in a service setup request transmitted by a base station device based on an SCTP connection as a request message and then transmits the request message to a target AMF corresponding to the AMF network address.

According to an aspect of the embodiments of the present disclosure, a non-transitory computer-readable medium is provided, storing a computer program, the computer program, when executed by a processor, performing the communication method according to foregoing embodiments.

According to an aspect of the embodiments of the present disclosure, an electronic device is provided, including: one or more processors; and a storage apparatus, configured to store one or more programs, the one or more programs, when executed by the one or more processors, causing the one or more processors to perform the communication method according to the foregoing embodiments.

According to the technical solutions provided by some embodiments of the present disclosure, after establishing an SCTP connection with a base station device, an SCTP proxy gateway receives a service setup request transmitted by the base station device based on the SCTP connection, and encapsulates request data included in the service setup request as a request message; then queries, according to pre-configured AMF domain name information, for an AMF network address corresponding to the AMF domain name information, and transmits the encapsulated request message to a target AMF corresponding to the AMF network address; and further encapsulates, based on an SCTP protocol, a response message returned by the target AMF for the request message to obtain a response result, and transmits the response result to the base station device. It can be seen that the technical solutions of the embodiments of the present disclosure optimize the networking mode between the base station device and the AMF through the SCTP proxy gateway, to not only implement flexibility of AMF deployment on the premise of ensuring secure communication between the AMF and the base station device, but also implement proper distribution of the AMF by querying for the AMF network address based on the AMF domain name information, thereby improving the service processing capability of the AMF. In addition, the technical solutions of the embodiments of the present disclosure also make it unnecessary to deploy other devices in the cloud where the AMF is located, thereby reducing the cost of remote deployment.

It is to be understood that the foregoing general descriptions and the following detailed descriptions are merely for illustration and explanation purposes and are not intended to limit the present disclosure.

BRIEF DESCRIPTION OF THE DRAWINGS

The accompanying drawings herein, which are incorporated into the specification and constitute a part of this specification, show embodiments that conform to the present disclosure, and are used for describing a principle of the present disclosure together with this specification. Apparently, the accompanying drawings in the following description show merely some embodiments of the present disclosure, and a person of ordinary skill in the art may still derive other drawings from these accompanying drawings without creative efforts. In the accompanying drawings:

FIG. 4 is a flowchart of a communication method according to an embodiment of the present disclosure.

FIG. 5 is a flowchart of a communication method according to an embodiment of the present disclosure.

FIG. 6 is a flowchart of a communication method according to an embodiment of the present disclosure.

DESCRIPTION OF EMBODIMENTS

Exemplary implementations are now described more comprehensively with reference to the accompanying drawings. However, the exemplary implementations may be performed in various forms, and are not to be understood as being limited to the examples described herein. Instead, the implementations are provided to make the present disclosure more thorough and complete and fully convey the idea of the exemplary implementations to a person skilled in the art.

In addition, the described features, structures, or characteristics may be combined in one or more embodiments in any appropriate manner. In the following descriptions, more specific details are provided to provide a comprehensive understanding of the embodiments of the present disclosure. However, a person skilled in the art is to be aware that, the technical solutions in the present disclosure may be performed without one or more of the specific details, or another method, unit, device, or step may be used. In other cases, well-known methods, apparatuses, implementations, or operations are not shown or described in detail, to avoid obscuring aspects of the present disclosure.

The block diagrams shown in the accompanying drawings are merely functional entities and do not necessarily correspond to physically independent entities. That is, the functional entities may be performed in the form of software, or performed in one or more hardware modules or integrated circuits, or performed in different networks and/or processor devices and/or microcontroller devices.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned herein means two or more. "And/or" describes an association relationship for describing associated objects and represents that three relationships may exist. For example, A and/or B may represent the following three cases: Only A exists, both A and B exist, and only B exists. The character "I" generally indicates an "or" relationship between the associated objects.

Figure 1:
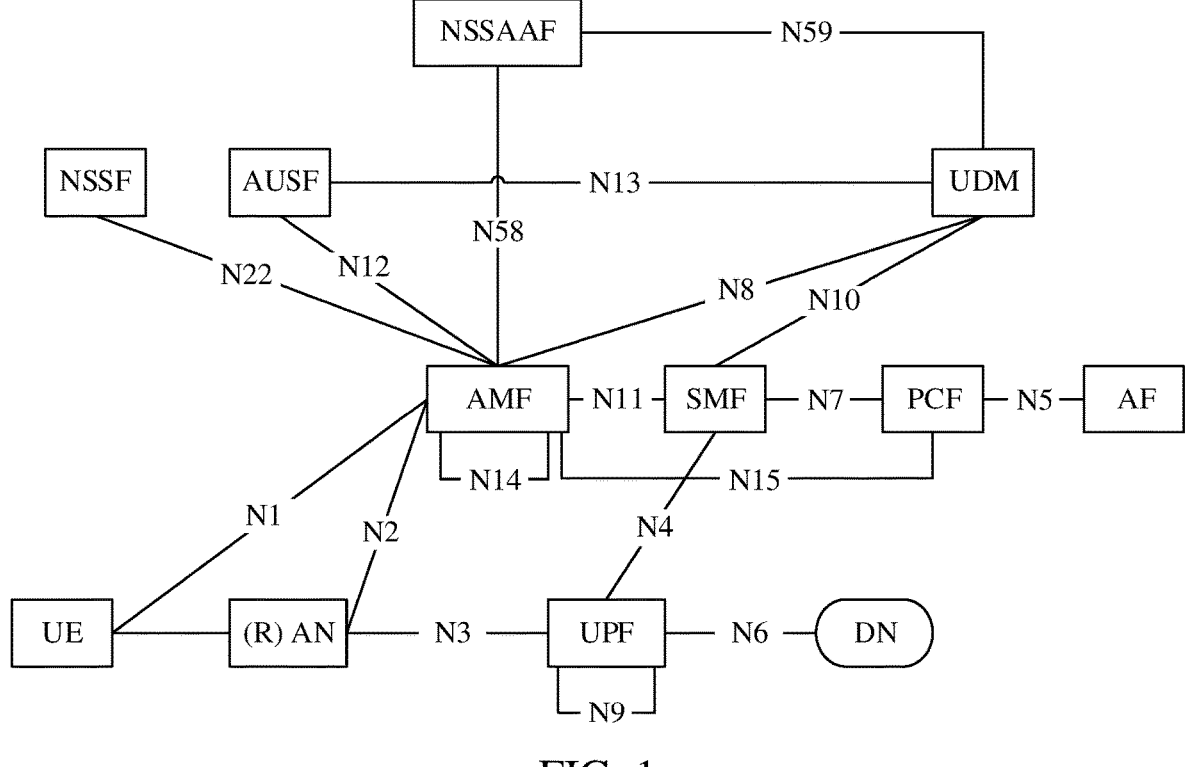
FIG. 1 is a schematic diagram of a key network element architecture of a 5G network.

FIG. 1 shows a key network element architecture of a 5G network defined by the 3GPP (The 3rd Generation Partnership Project) organization, where an AMF (Access and Mobility management Function), an SMF (Session Management Function), a UPF (User Plane Function), a PCF (Policy Control Function), an NSSF (Network Slice Selection Function), an AUSF (Authentication Server Function), a UDM (Unified Data Management), an NSSAAF (Network Slice Specific Authentication and Authorization Function), and the like are core network elements of the 5G network. UE (User Equipment) may be a 5G terminal such as a mobile phone and a tablet computer; a (R)AN ((Radio) Access Network)) may be a 5G base station device; and a DN (Data Network) is a service server accessed by the UE.

Still referring to FIG. 1, in a 5G core network element, the AMF is responsible for terminating an N2 interface of a control plane of a base station device, and implementing NGAP (Next Generation Application Protocol) coding and decoding based on an SCTP protocol. The base station device and the AMF transmit an application layer NGAP protocol through a transport layer SCTP protocol, and carry NAS signaling data of the UE in the NGAP. SCTP is a transport layer protocol, similar to TCP (Transmission Control Protocol) and UDP (User Datagram Protocol). The SCTP is widely used in a 4G LTE (Long Term Evolution) network and a 5G core network, but not supported by mainstream commercial NAT gateways and load balancers.

The AMF is also responsible for terminating an N1 interface of the UE, and implementing NAS (Non-Access Stratum) encryption and integrity protection, and is responsible for functions such as UE access verification, authorization management, registration, connection, reachability and mobility management, and transparent transmission of session management messages between the UE and the SMF.

In addition, referring to FIG. 1, the (R)AN and the UPF interact through an N3 interface; the UPP and the UPP may interact through an N9 interface; the UPF and the SMF interact through an N4 interface; the UPF and the DN interact through an N6 interface; the SMF and the AMF interact through an N11 interface; the SMF and the PCF interact through an N7 interface; the SMF and the UDF interact through an N10 interface; the PCF and the AF interact through an N5 interface; the AMF and the AMF may interact through an N14 interface; the AMF and the PCF interact through an N15 interface; the AMF and the UDM interact through an N8 interface; the AMF and the NSSF interact through an N22 interface; the AMF and the AUSF interact through an N12 interface; the AMF and the NSSAAF interact through an N58 interface; the AUSF and the UDM interact through an N13 interface; and the UDM and the NSSAAF interact through an N59 interface.

Figure 2:
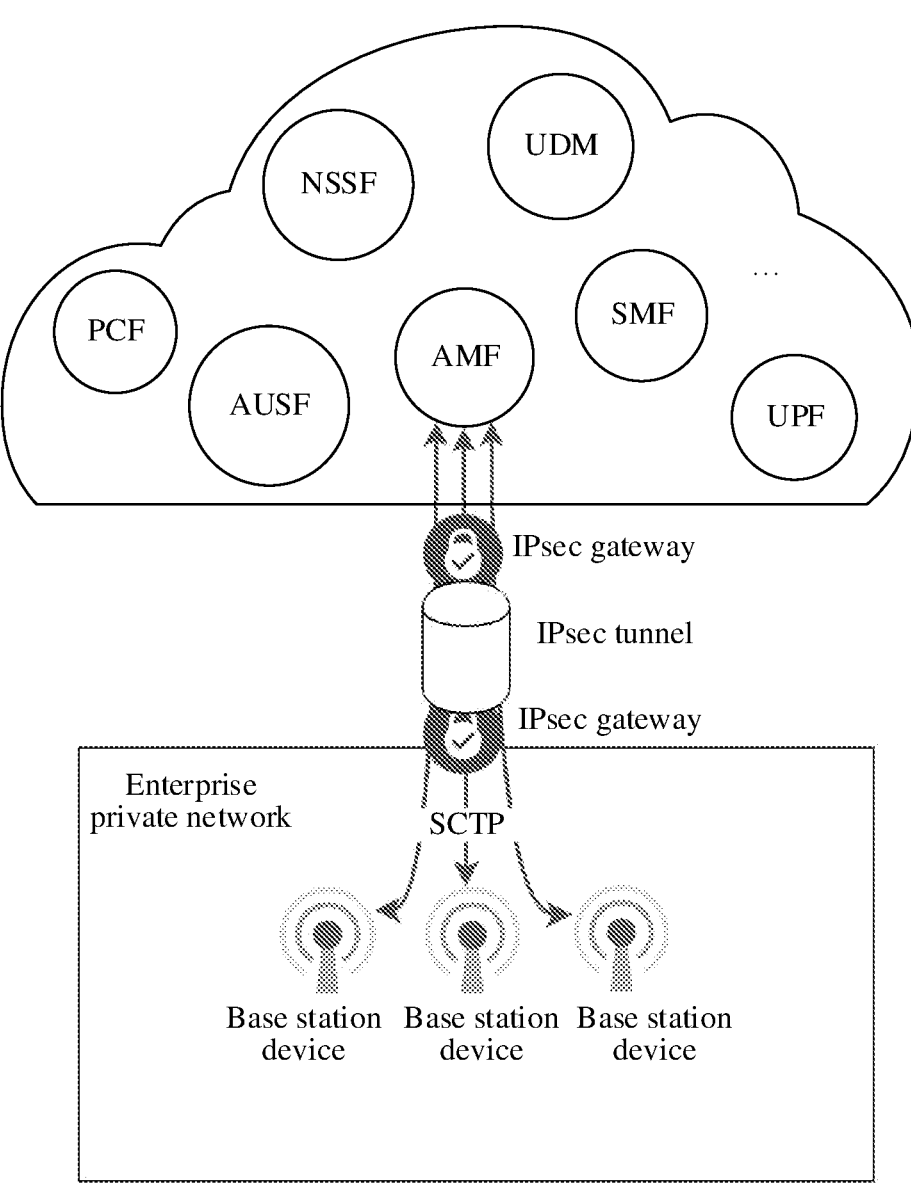
FIG. 2 is a schematic diagram of information transmission between a base station and an AMF through an encapsulated IPsec tunnel.

In the related art, if a core network of a 5G private network needs to be deployed in a local computer room of an enterprise private network, interaction information between core network elements is not exposed to a public network because it is interconnected through a local area network and does not involve operation such as NAT, which causes no security concerns. When the core network elements of the 5G private network are migrated to a cloud for deployment, in order to resolve the NAT problem of an SCTP connection between a base station device and a cloud AMF and message security during public network transmission, usually, it is necessary to encapsulate a layer of IPsec (Internet Protocol Security) tunnel on the SCTP as shown in FIG. 2. IPsec is based on UDP or TCP transmission, and may pass through NAT gateways of mainstream cloud service providers while encrypting messages.

However, in the technical solutions of the embodiment shown in FIG. 2, not only IPsec gateways need to be increased, but also the base station device side is required to support IPsec or add the IPsec gateways through a networking mode of setting up an IPsec tunnel between the base station device and the AMF. The cloud AMF also needs to put an IPsec gateway in front, and requiring cloud service providers to provide an IPsec gateway capability also causes dependence on cloud service providers. Moreover, due to the complexity of IPsec configuration, when the IPsec tunnel is set up between the IPsec gateways according to respective IP configuration, if the cloud AMF or the IPsec gateway changes IP, it is necessary to change configuration of all base station devices or IPsec gateways, which is a huge workload. In addition, because mainstream commercial devices do not support load balancing distribution of the SCTP, SCTP endpoints in the cloud will become a bottleneck of signaling performance of an AMF system, and it is impossible to take advantage of horizontal expansion of the cloud to improve the service processing capability of the AMF. Moreover, because the IPsec tunnel and the SCTP both adopt an IP connection mode, when an AMF service corresponding to the IP fails, the base station device has a weak fault handling capability and cannot switch to a normal AMF to continue the service.

Based on the foregoing problems, the technical solutions of the embodiments of the present disclosure provide a new solution. Specifically, referring to FIG. 3, an SCTP proxy gateway is added between the base station device and the AMF, and SCTP protocol messages are converted into gRPC (google Remote Procedure Call) and HTTP/2 (Hypertext Transfer Protocol 2.0) messages through the SCTP proxy gateway. On one hand, security and reliability of service data transmission in a public network are guaranteed; on the other hand, the SCTP connection is converted into gRPC and HTTP/2 connection, so that the AMF may be deployed more flexibly, for example, may be flexibly deployed to cloud computing resources provided by any cloud service provider, thereby getting rid of the dependence on cloud service providers.

Figure 3:
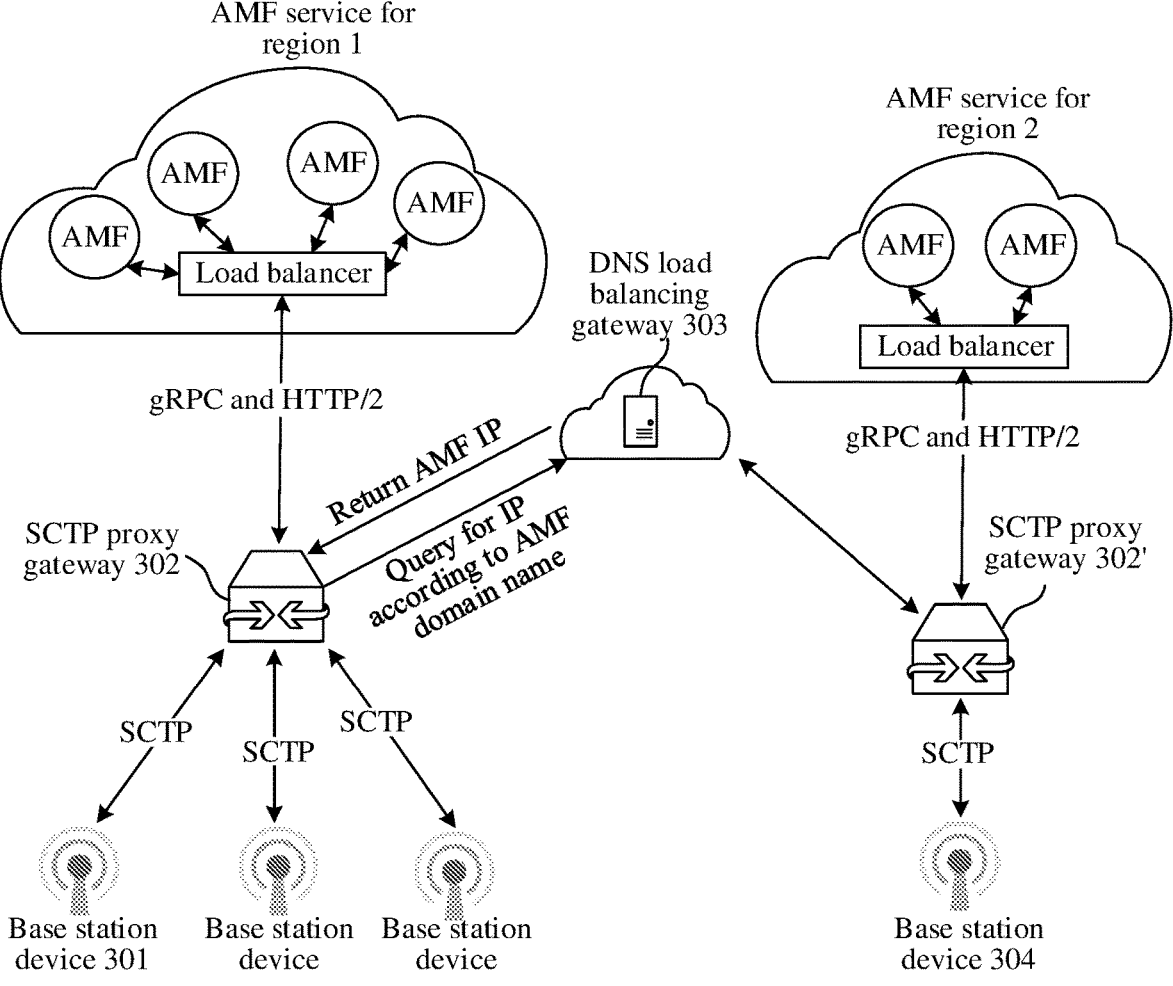
FIG. 3 is a schematic diagram of information transmission between a base station and an AMF by adding an SCTP proxy gateway according to an embodiment of the present disclosure.

Based on the system architecture shown in FIG. 3, a base station device 301 may transmit an SCTP connection request to an SCTP proxy gateway 302 and then sets up an SCTP connection with the base station device 301. After the base station device 301 sets up the SCTP connection with the SCTP proxy gateway 302, the base station device 301 may transmit a service setup request to the SCTP proxy gateway 302 based on the SCTP connection, and then the SCTP proxy gateway 302 encapsulates request data included in the service setup request (that is, payload of the service setup request) as a request message (such as a gRPC message or an HTTP/2 message).

Moreover, the SCTP proxy gateway 302 may transmit a DNS query request to a DNS load balancing gateway 303 according to pre-configured AMF domain name information, and the DNS load balancing gateway 303 allocates a corresponding AMF network address (such as an AMF network address of an allocation region 1) to the SCTP proxy gateway 302 according to the DNS query request, and returns a DNS query response. After receiving the DNS query response returned by the DNS load balancing gateway 303, the SCTP proxy gateway 302 obtains the allocated AMF network address from the DNS query response, and then transmits the encapsulated request message to a target AMF corresponding to the AMF network address. In some embodiments, the encapsulated request message may be transmitted to a load balancer corresponding to the AMF network address, and then distributed by the load balancer to an AMF instance for processing. After the AMF instance completes processing, the AMF instance returns a response message to the SCTP proxy gateway 302, and then the SCTP proxy gateway 302 encapsulates the received response message based on the SCTP protocol, and transmits the response message to the base station device 301.

Similarly, a base station device 304 may transmit an SCTP connection request to an SCTP proxy gateway 302' and then sets up an SCTP connection with the base station device 304. After the base station device 304 sets up the SCTP connection with the SCTP proxy gateway 302', the base station device 304 may transmit a service setup request to the SCTP proxy gateway 302' based on the SCTP connection, and then the SCTP proxy gateway 302' encapsulates request data included in the service setup request (that is, payload of the service setup request) as a request message (such as a gRPC message or an HTTP/2 message).

Moreover, the SCTP proxy gateway 302' may transmit a DNS query request to the DNS load balancing gateway 303 according to pre-configured AMF domain name information, and the DNS load balancing gateway 303 allocates a corresponding AMF network address (such as an AMF network address of an allocation region 2) to the SCTP proxy gateway 302' according to the DNS query request, and returns a DNS query response. After receiving the DNS query response returned by the DNS load balancing gateway 303, the SCTP proxy gateway 302' obtains the allocated AMF network address from the DNS query response, and then transmits the encapsulated request message to a target AMF corresponding to the AMF network address. In some embodiments, the encapsulated request message may be transmitted to a load balancer corresponding to the AMF network address, and then distributed by the load balancer to an AMF instance for processing. After the AMF instance completes processing, the AMF instance returns a response message to the SCTP proxy gateway 302', and then the SCTP proxy gateway 302' encapsulates the received response message based on the SCTP protocol, and transmits the response message to the base station device 304.

It can be seen that in the system architecture of the embodiment shown in FIG. 3, by deploying multi-level load balancing distribution capabilities such as the DNS load balancing gateway 303 and an AMF traffic inlet load balancer, the AMF can make full use of the horizontal expansion capability of the cloud, thereby greatly improving the service processing capability. The SCTP proxy gateway obtains a network address by querying for an AMF domain name, thereby greatly reducing configuration work. Moreover, the DNS load balancing gateway 303 may deploy the AMF geographically on the cloud, and allocate an AMF service nearby according to a source IP of the DNS query request (that is, an SCTP proxy gateway IP), thereby improving quality of service. When the AMF changes IP, it only needs to be changed on the DNS load balancing gateway 303. When an AMF service corresponding to an IP is abnormal, the SCTP proxy gateway may quickly switch to a normal AMF service through a query response returned by the DNS load balancing gateway 303.

In addition, compared with the system architecture shown in FIG. 2, the system architecture shown in FIG. 3 can replace the IPsec gateway on the base station side with the SCTP proxy gateway and removing the IPsec gateway in front of the cloud, to reduce the dependence on cloud service providers, thereby effectively reducing purchase costs of various services.

The implementation details of the technical solutions of the embodiments of the present disclosure are described below in detail.

FIG. 4 is a flowchart of a communication method according to an embodiment of the present disclosure. The communication method may be performed by an SCTP proxy gateway. Referring to FIG. 4, the communication method includes at least S410 to S440. A detailed description is as follows:

S410: Establish, in response to an SCTP connection request transmitted by a base station device, an SCTP connection with the base station device.

In an embodiment of the present disclosure, a network address of the SCTP proxy gateway, such as an IP address, may be pre-configured on the base station device. Then the base station device may transmit the SCTP connection request to the SCTP proxy gateway based on the pre-configured network address of the SCTP proxy gateway. After receiving the SCTP connection request, the SCTP proxy gateway may perform a communication handshake with the base station device to establish the SCTP connection with the base station device.

The base station device in this embodiment of the present disclosure may be a mobile communication base station in a general sense, or another device configured to implement functions of a mobile communication base station, such as a micro base station deployed indoors.

S420: Receive a service setup request transmitted by the base station device based on the SCTP connection after establishing the SCTP connection with the base station device, and encapsulate request data included in the service setup request as a request message.

In an embodiment of the present disclosure, the request data included in the service setup request may be encapsulated as a google Remote Procedure Call message, that is, a gRPC message; or the request data included in the service setup request may be encapsulated as a Hypertext Transfer Protocol message, that is, an HTTP/2 message.

S430: Query, based on pre-configured AMF domain name information, for an AMF network address corresponding to the AMF domain name information (that is, an AMF IP), and transmit the encapsulated request message to a target AMF corresponding to the AMF network address.

In an embodiment of the present disclosure, the process of querying, according to pre-configured AMF domain name information, for an AMF network address corresponding to the domain name information may be as follows: The SCTP proxy gateway generates a DNS query request according to the pre-configured AMF domain name information, and transmits the DNS query request to the DNS load balancing gateway, so that the DNS load balancing gateway allocates a corresponding AMF network address according to the DNS query request. Then the SCTP proxy gateway may receive a DNS query response returned by the DNS load balancing gateway and obtain the AMF network address from the DNS query response.

In an embodiment of the present disclosure, the process of the SCTP proxy gateway transmitting a request message to a target AMF corresponding to the AMF network address may be transmitting the request message to an AMF load balancer corresponding to the AMF network address according to the AMF network address, so that the AMF load balancer distributes the request message to a specified AMF instance for processing, where the specified AMF instance is the target AMF. Then the SCTP proxy gateway may receive a response message returned by the specified AMF instance for the request message.

In an embodiment of the present disclosure, if the pre-configured AMF domain name information is globally shared domain name information, the AMF network address corresponding to the AMF domain name information may be a network address of an AMF adjacent to the base station device. That is, in the technical solutions of this embodiment, the DNS load balancing gateway may allocate a close AMF to communicate with the base station device.

In an embodiment of the present disclosure, if the pre-configured AMF domain name information is exclusive AMF domain name information, the AMF network address corresponding to the AMF domain name information may be a network address of an AMF exclusive to the base station device. That is, the technical solutions of this embodiment can meet a requirement of an exclusive AMF.

Referring to FIG. 4, S440: Encapsulate, based on an SCTP protocol, a response message returned by the target AMF for the request message to obtain a response result, and transmit the response result to the base station device.

The technical solutions of the embodiment shown in FIG. 4 optimize the networking mode between the base station device and the AMF through the SCTP proxy gateway, to not only implement flexibility of AMF deployment on the premise of ensuring secure communication between the AMF and the base station device, but also implement proper distribution of the AMF by querying for the AMF network address based on the AMF domain name information on the premise of ensuring a secure communication between the AMF and the base station device, thereby improving the service processing capability of the AMF. In addition, the technical solutions of the embodiments of the present disclosure also make it unnecessary to deploy other devices in the cloud where the AMF is located, thereby reducing the cost of remote deployment.

Based on the technical solutions of the embodiment shown in FIG. 4, in an embodiment of the present disclosure, if the SCTP proxy gateway receives the service processing request transmitted by the base station device based on the SCTP connection after establishing the SCTP connection with the base station device, the SCTP proxy gateway may encapsulate the request data included in the service processing request as a service processing message, and transmit the service processing message to the target AMF, and then encapsulate, based on the SCTP protocol, a response message returned by the target AMF for the service processing message, and transmit the response message to the base station device. The technical solutions of this embodiment implement the service processing process between the base station device and the AMF through the SCTP proxy gateway.

In an embodiment of the present disclosure, the SCTP proxy gateway may re-query, according to pre-configured AMF domain name information, for an AMF network address corresponding to the domain name information in response to detecting that the target AMF is abnormal, and then respond to a service processing request from the base station device based on the AMF network address obtained by re-querying. The technical solutions of this embodiment enable the SCTP proxy gateway to switch to a normal AMF service in time when the AMF is abnormal.

The technical solutions of the embodiment shown in FIG. 4 is described from the perspective of the SCTP proxy gateway. The implementation details of the technical solutions of the embodiments of the present disclosure are described below from the perspective of the base station device and the DNS load balancing gateway respectively with reference to FIG. 5 and FIG. 6:

FIG. 5 is a flowchart of a communication method according to an embodiment of the present disclosure. The communication method may be performed by a base station device. Referring to FIG. 5, the communication method includes at least S510 to S530. A detailed description is as follows:

S510: Transmit an SCTP connection request to an SCTP proxy gateway and establish an SCTP connection with the SCTP proxy gateway.

In an embodiment of the present disclosure, a network address of the SCTP proxy gateway, such as an IP address, may be pre-configured on the base station device. Then the base station device may transmit the SCTP connection request to the SCTP proxy gateway based on the pre-configured network address of the SCTP proxy gateway. After receiving the SCTP connection request, the SCTP proxy gateway may perform a communication handshake with the base station device to establish the SCTP connection with the base station device.

S520: Transmit a service setup request to the SCTP proxy gateway based on the SCTP connection after establishing the SCTP connection with the SCTP proxy gateway, so that the SCTP proxy gateway encapsulates request data included in the service setup request as a request message and then transmits the request message to a target AMF, the target AMF being obtained by the SCTP proxy gateway by querying according to pre-configured AMF domain name information.

In an embodiment of the present disclosure, the SCTP proxy gateway may encapsulate the request data included in the service setup request as a google Remote Procedure Call message, that is, a gRPC message; or, the request data included in the service setup request may be encapsulated as a Hypertext Transfer Protocol message, that is, an HTTP/2 message.

S530: Receive a response result returned by the SCTP proxy gateway based on the SCTP connection, the response result being obtained by the SCTP proxy gateway by encapsulating, based on an SCTP protocol, a response message returned by the target AMF for the request message.

The specific implementation details of the embodiments shown in FIG. 5 may refer to the technical solution of the foregoing embodiments and are not to be described in detail.

FIG. 6 is a flowchart of a communication method according to an embodiment of the present disclosure. The communication method may be performed by a DNS load balancing gateway. Referring to FIG. 6, the communication method includes at least S610 to S630. A detailed description is as follows:

S610: Receive a DNS query request transmitted by an SCTP proxy gateway, the DNS query request being transmitted by the SCTP proxy gateway according to pre-configured AMF domain name information.

S620: Allocate an AMF network address corresponding to the AMF domain name information according to the DNS query request.

In an embodiment of the present disclosure, if the AMF domain name information is globally shared AMF domain name information, the AMF network address corresponding to the AMF domain name information allocated by the DNS load balancing gateway may be a network address of an AMF adjacent to the base station device. That is, in the technical solutions of this embodiment, the DNS load balancing gateway may allocate a close AMF to communicate with the base station device.

In an embodiment of the present disclosure, if the AMF domain name information is exclusive AMF domain name information, the AMF network address corresponding to the AMF domain name information allocated by the DNS load balancing gateway may be a network address of an AMF exclusive to the base station device. That is, the technical solutions of this embodiment can meet a requirement of an exclusive AMF.

S630: Generate a DNS query response according to the AMF network address, and transmit the DNS query response to the SCTP proxy gateway, so that the SCTP proxy gateway encapsulates request data included in a service setup request transmitted by a base station device based on an SCTP connection as a request message and then transmits the request message to a target AMF corresponding to the AMF network address.

Figure 7:
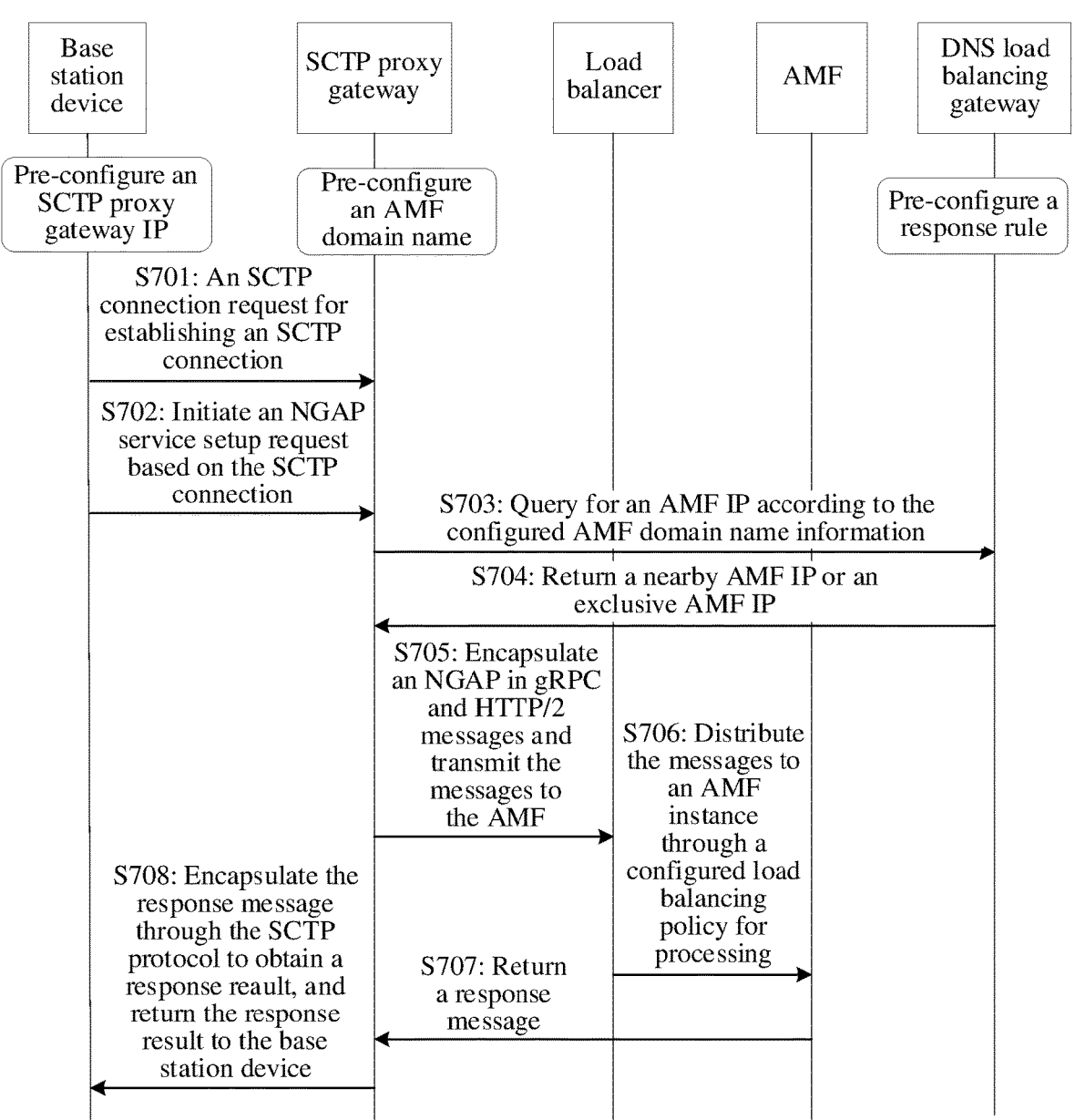
FIG. 7 is a flowchart of a communication method according to an embodiment of the present disclosure.

The implementation details of the technical solutions of the embodiments of the present disclosure are described above from the perspective of the SCTP proxy gateway, the base station device, and the DNS load balancing gateway respectively. An interaction process between the entities is described below in detail with reference to FIG. 7:

Before the steps of the communication method shown in FIG. 7 are performed, pre-configuration is required at the base station device, the SCTP proxy gateway, and the DNS load balancing gateway. Specifically, an IP address of the SCTP proxy gateway is pre-configured on the base station device, an AMF domain name is pre-configured on the SCTP proxy gateway, and a response rule is pre-configured on the DNS load balancing gateway.

In one embodiment, when the base station device is deployed in a private network coverage region, an AMF SCTP IP configured on the base station may be replaced with an SCTP listening IP of the SCTP proxy gateway in this region. Then the base station device may transmit a request to the SCTP proxy gateway in this region based on the SCTP listening IP.

During deployment of the SCTP proxy gateway, the AMF domain name may be configured according to needs of a service party: If the service party selects a shared cloud 5G core network, the AMF domain name configured on the SCTP proxy gateway is a globally shared AMF domain name; or if the service party selects an exclusive cloud 5G core network and applies for an exclusive domain name, the AMF domain name configured on the SCTP proxy gateway is an exclusive AMF domain name of the service party.

Moreover, in order to implement a nearby service, DNS LB (Load Balance) may be pre-configured when a 5G core network is deployed in a cloud sub-region: If a source address of a DNS request comes from the SCTP proxy gateway, returning a 5G core network AMF IP to a corresponding region may be selected in combination with service configuration. Moreover, an intervention mode may be added to return the configured IP for different source addresses, such as returning a set IP address for a source address.

Based on the information pre-configured in the foregoing embodiments, as shown in FIG. 7, the communication method according to an embodiment of the present disclosure includes the following steps:

S701: A base station device initiates an SCTP connection request for establishing an SCTP connection to an SCTP proxy gateway.

After receiving the SCTP connection request transmitted by the base station device, the SCTP proxy gateway completes setup of the SCTP connection through four SCTP communication handshakes.

S702: The base station device initiates an NGAP service setup request based on the SCTP connection.

In one embodiment, the base station device may transmit messages such as an NG (Next Generation) setup request and an Uplink NAS Transport message to the SCTP proxy gateway, and the SCTP proxy gateway takes out content (payload) carried in the SCTP and encapsulates the content in gRPC and HTTP/2 messages.

S703: The SCTP proxy gateway queries for an AMF IP according to the configured AMF domain name information.

In one embodiment, the SCTP proxy gateway queries the DNS LB (that is, the DNS load balancing gateway) for the AMF IP corresponding to the pre-configured AMF domain name information according to the configured AMF domain name information.

S704: The DNS load balancing gateway returns a nearby AMF IP or an exclusive AMF IP to the SCTP proxy gateway.

In one embodiment, if the configured AMF domain name information is globally shared AMF domain name information, the nearby AMF IP is returned; or if the configured AMF domain name information is exclusive AMF domain name information, the exclusive AMF IP is returned.

S705: Encapsulate an NGAP in gRPC and HTTP/2 messages, and transmit the messages to the AMF.

S706: The load balancer in the cloud distributes the messages to an AMF instance through a configured load balancing policy for processing.

In one embodiment, the load balancer in the cloud may adopt Layer 4 (that is, L4) or Layer 7 (that is, L7) load balancing to forward, according to configuration rules and load conditions, the gRPC and HTTP/2 messages to an AMF instance in an AMF instance pool for processing.

The L4 load balancing mainly works in a transport layer in the middle of an OSI model (Open System Interconnection Reference Model), and mainly deals with transmission of messages regardless of content of messages. The L4 load balancing only deals with network packets transmitted and received by an upstream service, and does not check the specific content in the packets. The L4 load balancing may decide whether to restrict routing by checking the first several packets in a TCP flow.

The L7 load balancing mainly works in an application layer at the top of the OSI model, and mainly deals with the real content in each message. On the Internet, HTTP is a dominant Layer 7 Protocol in network communication. The L7 load balancing is more complex and ingenious than the L4 load balancing in routing network transmission, and is especially suitable for TCP-based transmission like HTTP. A L7 load balancer terminates network transmission and reads the content in the messages. It may make load balancing decisions based on the content in the messages (such as information in a URL (Uniform Resource Locator) or cookie). Then, the L7 load balancer sets up a new TCP connection to select the upstream service (or reuse an existing TCP connection through HTTP keepalives) to transmit a request to this service.

S707: The AMF instance returns a response message to the SCTP proxy gateway after completing processing.

S708: The SCTP proxy gateway encapsulates the response message through the SCTP protocol to obtain a response result, and returns the response result to the base station device.

It can be seen that the technical solutions of the embodiments of the present disclosure optimize the networking mode between the base station and the AMF through the SCTP proxy gateway, to not only implement flexibility of AMF deployment on the premise of ensuring secure communication between the AMF and the base station device, but also implement proper distribution of the AMF by querying for the AMF network address based on the AMF domain name information, so that the AMF can make full use of the horizontal expansion capability of the cloud, thereby greatly improving the service processing capability. Moreover, when an AMF service is abnormal, the SCTP proxy gateway may switch to a normal AMF service quickly, thereby improving the fault handling capability and quality of service. In addition, the technical solutions of the embodiments of the present disclosure also make it unnecessary to deploy other devices in the cloud where the AMF is located, thereby reducing the cost of remote deployment.

The following describes the apparatus embodiments of the present disclosure, which may be used for performing the communication method in the foregoing embodiments of the present disclosure. For details not disclosed in the apparatus embodiments of the present disclosure, reference is made to the embodiments of the foregoing communication method of the present disclosure.

Figure 8:
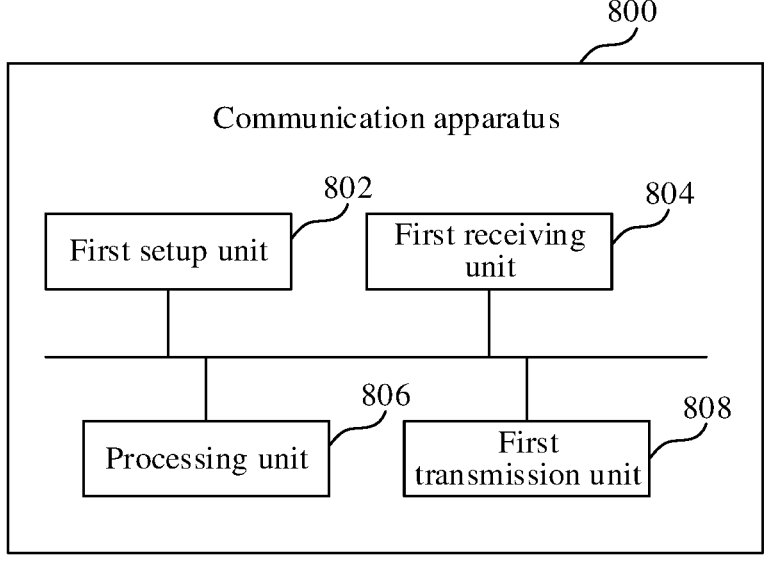
FIG. 8 is a block diagram of a communication apparatus according to an embodiment of the present disclosure.

FIG. 8 is a block diagram of a communication apparatus according to an embodiment of the present disclosure. The communication apparatus may be disposed in an SCTP proxy gateway.

Referring to FIG. 8, the communication apparatus 800 according to an embodiment of the present disclosure includes a first setup unit 802, a first receiving unit 804, a processing unit 806, and a first transmission unit 808.

The first setup unit 802 is configured to establish, in response to an SCTP connection request transmitted by a base station device, an SCTP connection with the base station device; the first receiving unit 804 is configured to receive a service setup request transmitted by the base station device based on the SCTP connection after the SCTP connection with the base station device is established, and encapsulate request data included in the service setup request as a request message; the processing unit 806 is configured to query, according to pre-configured AMF domain name information, for an AMF network address corresponding to the AMF domain name information, and transmit the request message to a target AMF corresponding to the AMF network address; and the first transmission unit 808 is configured to encapsulate, based on an SCTP protocol, a response message returned by the target AMF for the request message to obtain a response result, and transmit the response result to the base station device.

In some embodiments of the present disclosure, based on the foregoing solutions, the processing unit 806 is configured to generate a DNS query request according to pre-configured AMF domain name information; transmit the DNS query request to a DNS load balancing gateway, so that the DNS load balancing gateway allocates a corresponding AMF network address according to the DNS query request; and receive a DNS query response returned by the DNS load balancing gateway, to obtain the AMF network address from the DNS query response.

In some embodiments of the present disclosure, based on the foregoing solutions, the processing unit 806 is configured to transmit the request message to an AMF load balancer corresponding to the AMF network address according to the AMF network address, so that the AMF load balancer allocates the request message to a specified AMF instance for processing, where the specified AMF instance is the target AMF; and the first receiving unit 804 is configured to receive a response message returned by the specified AMF instance for the request message.

In some embodiments of the present disclosure, based on the foregoing solutions, the first receiving unit 804 is further configured to: after the SCTP connection with the base station device is established, receive a service processing request transmitted by the base station device based on the SCTP connection, and encapsulate request data included in the service setup request as a service processing message, and transmit the service processing message to the target AMF; and the first transmission unit 808 is further configured to encapsulate, based on the SCTP protocol, a response message returned by the target AMF for the service processing message, and transmit the response message to the base station device.

In some embodiments of the present disclosure, based on the foregoing solutions, the processing unit 806 is further configured to: re-query, according to pre-configured AMF domain name information, for an AMF network address corresponding to the domain name information in response to detecting that the target AMF is abnormal; and respond to a service processing request from the base station device based on the AMF network address obtained by re-querying.

In some embodiments of the present disclosure, based on the foregoing solutions, in response to that the pre-configured AMF domain name information includes globally shared AMF domain name information, the AMF network address corresponding to the domain name information is a network address of an AMF adjacent to the base station device.

In some embodiments of the present disclosure, based on the foregoing solutions, in response to that the pre-configured AMF domain name information includes exclusive AMF domain name information, the AMF network address corresponding to the domain name information is a network address of an AMF exclusive to the base station device.

In some embodiments of the present disclosure, based on the foregoing solutions, the first receiving unit 804 is further configured to encapsulate the request data included in the service setup request as a google remote procedure call message; or encapsulate the request data included in the service setup request as a Hypertext Transfer Protocol message.

Figure 9:
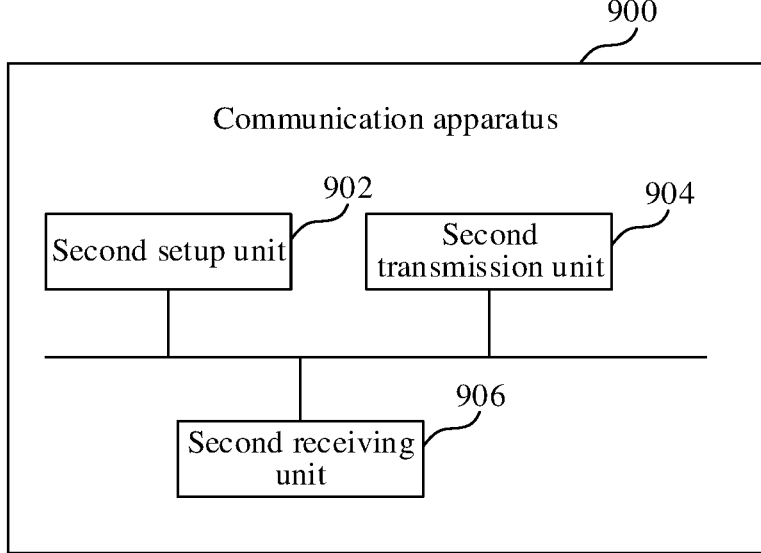
FIG. 9 is a block diagram of a communication apparatus according to an embodiment of the present disclosure.

FIG. 9 is a block diagram of a communication apparatus according to an embodiment of the present disclosure. The communication apparatus may be disposed in a base station device.

Referring to FIG. 9, the communication apparatus 900 according to an embodiment of the present disclosure includes a second setup unit 902, a second transmission unit 904, and a second receiving unit 906.

The second setup unit 902 is configured to transmit an SCTP connection request to an SCTP proxy gateway and establish an SCTP connection with the SCTP proxy gateway; the second transmission unit 904 is configured to transmit a service setup request to the SCTP proxy gateway based on the SCTP connection after the SCTP connection with the SCTP proxy gateway is established, so that the SCTP proxy gateway encapsulates request data included in the service setup request as a request message and then transmits the request message to a target AMF, the target AMF being obtained by the SCTP proxy gateway by querying according to pre-configured AMF domain name information; and the second receiving unit 906 is configured to receive a response result returned by the SCTP proxy gateway based on the SCTP connection, the response result being obtained by the SCTP proxy gateway by encapsulating, based on an SCTP protocol, a response message returned by the target AMF for the request message.

In some embodiments of the present disclosure, based on the foregoing solutions, the second setup unit 902 is configured to transmit, according to a network address of a pre-configured SCTP proxy gateway, an SCTP connection request to the SCTP proxy gateway.

Figure 10:
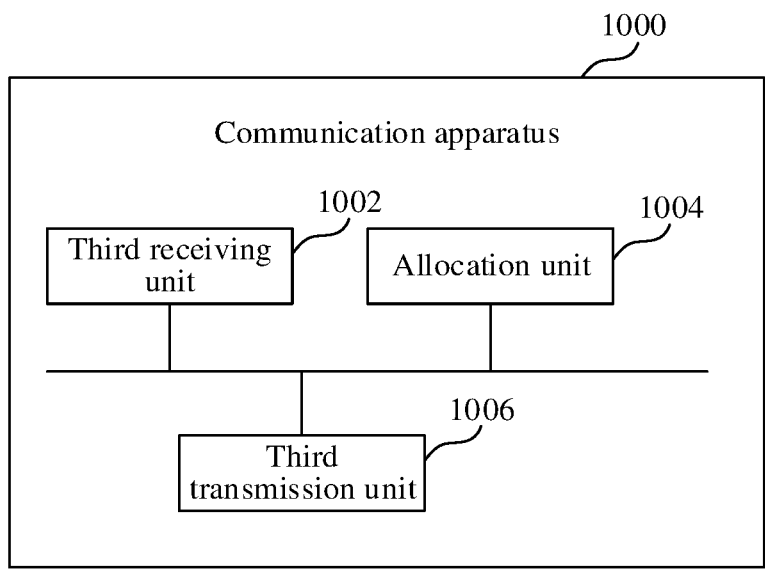
FIG. 10 is a block diagram of a communication apparatus according to an embodiment of the present disclosure.

FIG. 10 is a block diagram of a communication apparatus according to an embodiment of the present disclosure. The communication apparatus may be disposed in a DNS load balancing gateway.

Referring to FIG. 10, the communication apparatus 1000 according to an embodiment of the present disclosure includes a third receiving unit 1002, an allocation unit 1004, and a third transmission unit 1006.

The third receiving unit 1002 is configured to receive a DNS query request transmitted by a stream control transmission protocol SCTP proxy gateway, the DNS query request being transmitted by the SCTP proxy gateway according to pre-configured AMF domain name information; the allocation unit 1004 is configured to allocate an AMF network address corresponding to the AMF domain name information according to the DNS query request; and the third transmission unit 1006 is configured to generate a DNS query response according to the AMF network address, and transmit the DNS query response to the SCTP proxy gateway, so that the SCTP proxy gateway encapsulates request data included in a service setup request transmitted by a base station device based on an SCTP connection as a request message and then transmits the request message to a target AMF corresponding to the AMF network address.

Figure 11:
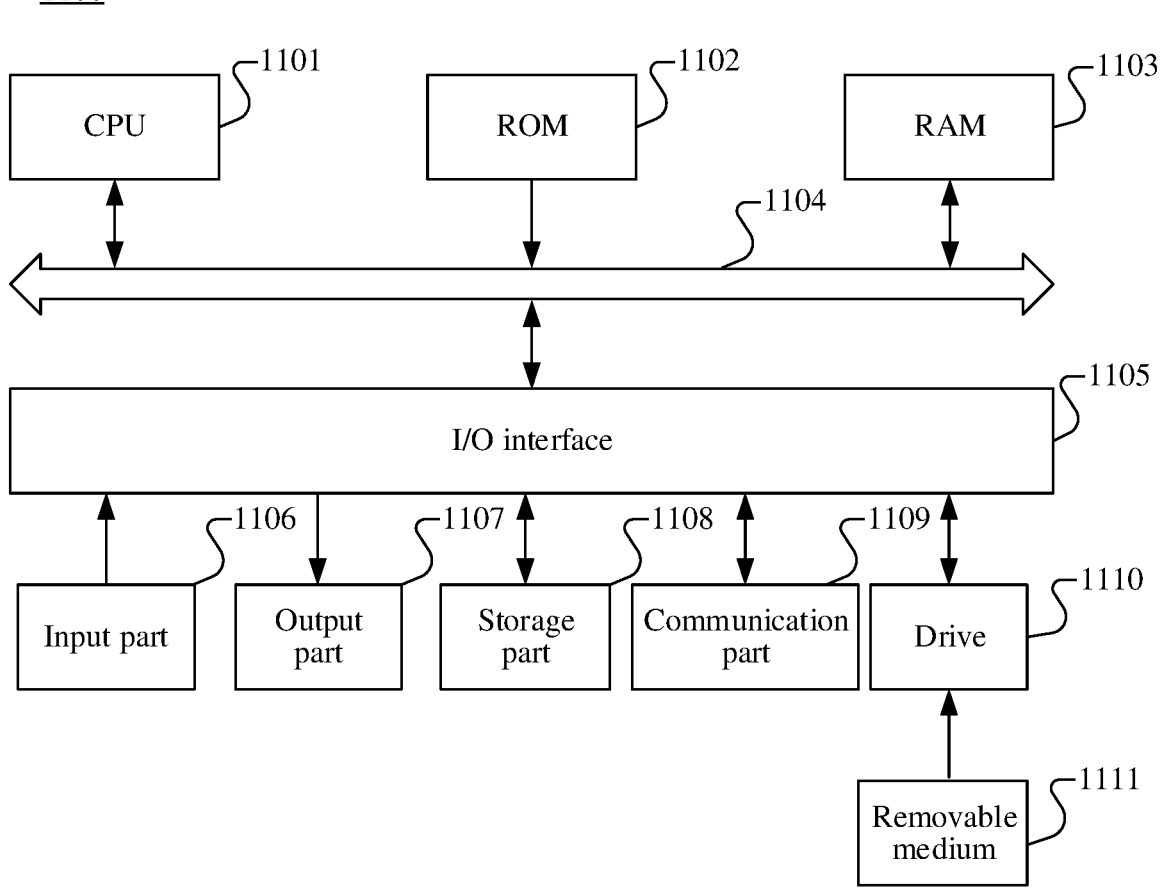
FIG. 11 is a schematic structural diagram of a computer system of an electronic device adapted to implement the embodiments of the present disclosure.

FIG. 11 is a schematic structural diagram of a computer system of an electronic device adapted to implement the embodiments of the present disclosure.

The computer system 1100 of the electronic device shown in FIG. 11 is merely an example, and does not constitute any limitation on functions and use ranges of the embodiments of the present disclosure.

As shown in FIG. 11, the computer system 1100 includes a central processing unit (CPU) 1101. The CPU 1101 may perform various appropriate actions and processing according to a program stored in a read-only memory (ROM) 1102 or a program loaded from a storage part 1108 into a random access memory (RAM) 1103, for example, perform the method described in the foregoing embodiments. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like; an output part 1107 including a cathode ray tube (CRT), a liquid crystal display (LCD), a speaker, or the like; a storage part 1108 including a hard disk, or the like; and a communication part 1109 including a network interface card such as a local area network (LAN) card or a modem. The communication part 1109 performs communication processing by using a network such as the Internet. A drive 1110 is also connected to the I/O interface 1105 as required. A removable medium 1111, such as a magnetic disk, an optical disc, a magneto-optical disk, or a semiconductor memory, is mounted on the drive 1110 as required, so that a computer program read from the removable medium is mounted on the storage part 1108 as required.

Particularly, according to the embodiments of the present disclosure, the processes described above with reference to the flowcharts may be implemented as computer software programs. For example, this embodiment of the present disclosure includes a computer program product. The computer program product includes a computer program stored on a computer-readable medium. The computer program includes computer code used for performing the methods shown in the flowcharts. In such an embodiment, the computer program may be downloaded and installed from a network through the communication part 1109, and/or installed from the removable medium 1111. When the computer program is executed by the CPU 1101, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal being in a baseband or propagated as part of a carrier wave, the data signal carrying computer-readable computer code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any appropriate combination thereof.

The flowcharts and block diagrams in the accompanying drawings illustrate example system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for performing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be performed by using a dedicated hardware-based system that performs a specified function or operation, or may be performed by using a combination of dedicated hardware and computer instructions.

Related units described in the embodiments of the present disclosure may be implemented in a software manner, or may be implemented in a hardware manner, and the unit described may also be set in a processor. Names of the units do not constitute a limitation on the units in a specific case.

According to another aspect, the present disclosure further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the embodiments of the present disclosure, the features and functions of two or more modules or units described above may be specified in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of the present disclosure may be performed in a form of a software product. The software product may be stored in a nonvolatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

After considering the specification and practicing the disclosed embodiments, a person skilled in the art may easily conceive of other implementations of the present disclosure. The present disclosure is intended to cover any variations, uses or adaptive changes of the present disclosure. Such variations, uses or adaptive changes follow the general principles of the present disclosure, and include well-known knowledge and technical means in the art that are not disclosed in the present disclosure.

It is to be understood that the present disclosure is not limited to the precise structures described above and shown in the accompanying drawings, and various modifications and changes may be made without departing from the scope of the present disclosure. The scope of the present disclosure is limited by the appended claims only.

What is claimed is:

1. A communication method, performed by a Stream Control Transmission Protocol (SCTP) proxy gateway, the communication method comprising:
   establishing, in response to an SCTP connection request transmitted by a base station device, an SCTP connection with the base station device;
   receiving a service setup request transmitted by the base station device based on the SCTP connection after the SCTP connection is established;
   encapsulating request data comprised in the service setup request as a request message;
   generating a Domain Name System (DNS) query request according to pre-configured Access and Mobility Management Function (AMF) domain name information;
   transmitting the DNS query request to a DNS load balancing gateway, so that the DNS load balancing gateway allocates a single corresponding AMF network address according to the DNS query request;
   receiving, from the DNS load balancing gateway, a DNS query response that includes the single corresponding AMF network address allocated by the DNS load balancing gateway, and obtaining the AMF network address from the DNS query response;
   transmitting the request message to a target AMF corresponding to the AMF network address;
   encapsulating, based on an SCTP protocol, a response message returned by the target AMF for the request message to obtain a response result; and
   transmitting the response result to the base station device.

2. The communication method according to claim 1, wherein the transmitting the request message to the target AMF corresponding to the AMF network address comprises:
   transmitting the request message to an AMF load balancer corresponding to the AMF network address according to the AMF network address, so that the AMF load balancer allocates the request message to a specified AMF instance for processing, wherein the specified AMF instance is the target AMF; and
   the method further comprises:
   receiving a response message returned by the specified AMF instance for the request message.

3. The communication method according to claim 1, further comprising:

receiving a service processing request transmitted by the base station device based on the SCTP connection;

encapsulating request data comprised in the service processing request as a service processing message, and transmitting the service processing message to the target AMF; and encapsulating, based on the SCTP protocol, a response message returned by the target AMF for the service processing message, and transmitting the response message to the base station device.

4. The communication method according to claim 1, further comprising:

re-querying, according to the pre-configured AMF domain name information, for an AMF network address corresponding to the AMF domain name information in response to detecting that the target AMF is abnormal; and responding to a service processing request from the base station device based on the AMF network address obtained by re-querying.

5. The communication method according to claim 1, wherein in response to that the pre-configured AMF domain name information comprises globally shared AMF domain name information, the AMF network address corresponding to the AMF domain name information is a network address of an AMF adjacent to the base station device.

6. The communication method according to claim 1, wherein in response to that the pre-configured AMF domain name information comprises exclusive AMF domain name information, the AMF network address corresponding to the AMF domain name information is a network address of an AMF exclusive to the base station device.

7. The communication method according to claim 1, wherein the encapsulating request data comprised in the service setup request as the request message comprises:

encapsulating the request data comprised in the service setup request as a google Remote Procedure Call message.

8. The communication method according to claim 1, wherein the encapsulating request data comprised in the service setup request as the request message comprises:

encapsulating the request data comprised in the service setup request as a Hypertext Transfer Protocol message.

9. A communication apparatus, deployed on a Stream Control Transmission Protocol (SCTP) proxy gateway, the communication apparatus comprising:

one or more processors; and a storage apparatus, configured to store one or more programs, the one or more programs, when executed by the one or more processors, causing the one or more processors to perform:

establishing, in response to an SCTP connection request transmitted by a base station device, an SCTP connection with the base station device;

receiving a service setup request transmitted by the base station device based on the SCTP connection after the SCTP connection is established;

encapsulating request data comprised in the service setup request as a request message;

generating a Domain Name System (DNS) query request according to pre-configured Access and Mobility Management Function (AMF) domain name information;

transmitting the DNS query request to a DNS load balancing gateway, so that the DNS load balancing gateway allocates a single corresponding AMF network address according to the DNS query request;

receiving, from the DNS load balancing gateway, a DNS query response that includes the single corresponding AMF network address allocated by the DNS load balancing gateway, and obtaining the AMF network address from the DNS query response;

transmitting the request message to a target AMF corresponding to the AMF network address;

encapsulating, based on an SCTP protocol, a response message returned by the target AMF for the request message to obtain a response result; and transmitting the response result to the base station device.

10. The communication apparatus according to claim 9, wherein the transmitting the request message to the target AMF corresponding to the AMF network address comprises:

transmitting the request message to an AMF load balancer corresponding to the AMF network address according to the AMF network address, so that the AMF load balancer allocates the request message to a specified AMF instance for processing, wherein the specified AMF instance is the target AMF; and the one or more programs further cause the one or more processors to perform:

receiving a response message returned by the specified AMF instance for the request message.

11. The communication apparatus according to claim 9, wherein the one or more programs further cause the one or more processors to perform:

receiving a service processing request transmitted by the base station device based on the SCTP connection;

encapsulating request data comprised in the service processing request as a service processing message, and transmitting the service processing message to the target AMF; and encapsulating, based on the SCTP protocol, a response message returned by the target AMF for the service processing message, and transmitting the response message to the base station device.

12. The communication apparatus according to claim 9, wherein the one or more programs further cause the one or more processors to perform:

re-querying, according to the pre-configured AMF domain name information, for an AMF network address corresponding to the AMF domain name information in response to detecting that the target AMF is abnormal; and responding to a service processing request from the base station device based on the AMF network address obtained by re-querying.

13. The communication apparatus according to claim 9, wherein in response to that the pre-configured AMF domain name information comprises globally shared AMF domain name information, the AMF network address corresponding to the AMF domain name information is a network address of an AMF adjacent to the base station device.

14. The communication apparatus according to claim 9, wherein in response to that the pre-configured AMF domain name information comprises exclusive AMF domain name information, the AMF network address corresponding to the AMF domain name information is a network address of an AMF exclusive to the base station device.

15. The communication apparatus according to claim 9, wherein the encapsulating request data comprised in the service setup request as the request message comprises:

encapsulating the request data comprised in the service setup request as a google Remote Procedure Call message.

16. The communication apparatus according to claim 9, wherein the encapsulating request data comprised in the service setup request as the request message comprises:

encapsulating the request data comprised in the service setup request as a Hypertext Transfer Protocol message.

17. A non-transitory computer-readable medium, storing a computer program, the computer program, when executed by at least one processor, causing the at least one processor to perform:

establishing, in response to an SCTP connection request transmitted by a base station device, an SCTP connection with the base station device;

receiving a service setup request transmitted by the base station device based on the SCTP connection after the SCTP connection is established;

encapsulating request data comprised in the service setup request as a request message;

generating a Domain Name System (DNS) query request according to pre-configured Access and Mobility Management Function (AMF) domain name information;

transmitting the DNS query request to a DNS load balancing gateway, so that the DNS load balancing gateway allocates a single corresponding AMF network address according to the DNS query request;

receiving, from the DNS load balancing gateway, a DNS query response that includes the single corresponding AMF network address allocated by the DNS load balancing gateway, and obtaining the AMF network address from the DNS query response;

transmitting the request message to a target AMF corresponding to the AMF network address;

encapsulating, based on an SCTP protocol, a response message returned by the target AMF for the request message to obtain a response result; and transmitting the response result to the base station device.

* * * * *